United States Patent
Nguyen et al.

(10) Patent No.: US 6,333,920 B1
(45) Date of Patent: Dec. 25, 2001

(54) FREQUENCY DIVISION DUPLEXING SYSTEM WHICH ACCOMMODATES SYMMETRIC AND ASYMMETRIC CHANNELS

(75) Inventors: Mai-Huong Nguyen, Eatontown; Jean-Jacques Werner, Holmdel, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/926,497

(22) Filed: Sep. 8, 1997

Related U.S. Application Data

(60) Provisional application No. 60/025,683, filed on Sep. 9, 1996.

(51) Int. Cl.[7] .................................................. H04J 1/00
(52) U.S. Cl. ................................................ 370/281; 370/286
(58) Field of Search .................................. 370/278, 280, 370/281, 286, 295, 296, 480, 481, 482, 485, 468, 498, 282, 478, 319, 330, 343, 345; 375/295, 296, 227, 226, 298, 222, 346, 349; 709/235; 348/6–15

(56) References Cited

U.S. PATENT DOCUMENTS

| | | | |
|---|---|---|---|
| 5,812,786 | * 9/1998 | Seazholtz ............................ | 709/235 |
| 5,822,102 | * 10/1998 | Bodeep et al. ........................ | 359/167 |
| 5,838,667 | * 11/1998 | Bingham ............................... | 370/294 |
| 5,966,410 | * 10/1999 | Freyman .............................. | 375/296 |
| 6,002,722 | * 12/1999 | Wu ........................................ | 375/295 |

OTHER PUBLICATIONS

Schmucking, Transmission capacity and design of VDSL system, IEEE, 1426–1431, Jun. 1996.*
Transmission Capacity and design of a VHDSL system, Schmucking, IEEE, pp. 1426–1431, Jun. 1996.*
Spectral Compatibility of ADSL, Kamran, IEEE, pp. 1969–1973, 1991.*
Performance Evaluation of a Multichannel Transceiver System for ADSL and VHDSL, Chow, IEEE, pp. 909–919, 1991.*
QAM transceiver, Barton, IEEE, pp. 2002–2006, 1991.*

* cited by examiner

Primary Examiner—Wellington Chin
Assistant Examiner—Steven Nguyen
(74) Attorney, Agent, or Firm—Priest & Goldstein, PLLC

(57) ABSTRACT

A communications system employs frequency division duplexing to accommodate symmetric and asymmetric services, while substantially eliminating near-end cross talk. Upstream and downstream channels are separated by a guard band in order to insure that near-end cross talk is kept to a minimum. An asymmetric upstream channel is preferably located at a lower frequency range than that of the asymmetric downstream channel. The guard band between these asymmetric upstream and downstream channels shifts in frequency along with the shift in frequency of the respective upstream and downstream channels as a function of reach. This guard band shifting permits the communications systems to utilize a greater percentage of the frequencies available to it and to thereby substantially maximize the communications rate that it can support. Although the asymmetric guard band is allowed to shift in the manner described, it is not allowed to do so in a manner that would create a conflict with symmetric channels. Additionally, for symmetric services upstream channels are provided both above and below a downstream channel and are located so as not to interfere with asymmetric channels.

22 Claims, 5 Drawing Sheets

FREQUENCY DIVISION DUPLEXING SYSTEM WHICH ACCOMMODATES SYMMETRIC AND ASYMMETRIC CHANNELS

This application claims the benefit of U.S. Provisional Application No. 60/025,683, filed Sep. 9, 1996.

BACKGROUND OF THE INVENTION

1. Field of the Invention

The present invention relates generally to telephone transmission and, more particularly, to the efficient transmission of high-speed digital signals between a telephone central office and the customer premises.

2. Description of the Related Art

Perhaps the most flexible and least expensive approach for transmitting data over telephone lines is to use the existing voiceband telephone channels normally used to carry speech. The channel between the transmission endpoints may be either a switched network connection which may be established by the user at one endpoint by simply dialing the telephone number of the other endpoint, or it may be a permanent, private line connection which is set up for the user by the telephone company. In either case, once the connection has been established, data from the user's data communication processing equipment is input to a voiceband modem which generates an output analog line signal having a frequency spectrum which matches the passband of the voiceband telephone channel. At the receiving end, a matching modem recovers the data from the received line signal and passes it to the user's equipment at that end.

For a given level of noise and distortion, the rate at which data can be communicated over a channel is limited by its bandwidth and noise, including distortion, within the channel. The bandwidth of the typical voiceband telephone channel is about 4 kHz. For typical levels of noise, this limits the transmission rate over such channels to a theoretical maximum to about 20 to 30 kilobits per second (kb/s). For many applications, such as database input or retrieval or other applications typically involving a human being at one end of the transaction, these data rates are wholly satisfactory.

For many other applications, however, such as computer to computer file transfers, videotext, transmission of digitized speech or video and the like, voiceband telephone data transmission is unacceptably slow. Advantageously, most of the transmission facilities interconnecting telephone switching offices communicate their information in the form of multiplexed, high speed digital bit streams. These facilities can be configured to provide not only the standard 4 kHz voiceband channels, but also wideband channels capable of carrying customer data at, for example, the so-called DS-1 rate of 1.544 megabits per second (Mb/s) and higher.

The challenge, however, is to get the customer's high-speed data to the central office, and high speed data from the central office to the customer. In the future, this may be accomplished by linking customer premises with central offices through optical fiber. However, it could be well into the twenty first century before such a system is put in place. For the immediate future, the existing telephone local distribution system-comprising copper wire pairs will continue to be the physical medium for delivering high-speed data to customer premises.

Telephone engineers have been successful in providing transmission schemes that allow for high-speed data transmission from customer locations to the central office. In the mid-1970's, for example, AT&T introduced a digital data communications network, the Digital Data System (DDS), in which data at rates up to 56 kb/s was transmitted from the customer locations to the central office using a four-wire local circuit, that is, two two-wire pairs. The essence of the transmission scheme was to use bipolar baseband transmission in combination with, inter alia, fixed equalization to compensate for linear distortion and thereby provide a channel with flat loss up to frequencies sufficient to transmit at the required bit rate. This scheme allowed for transmission over distances of almost eight miles at the 56 kb/s rate and even greater distance at lower rates without the use of repeaters, thereby providing high-speed customer-premises-to-central-office transmission over the "local loop" for a significant base of customers. See, for example, E. C. Bender et al., "Digital Data System: Local Distribution System", The Bell System Technical Journal, Vol. 54, No. 5, May-June 1975, which is incorporated herein in its entirety.

Subsequently, a 1.544 Mb/s speed was added to DDS, and data transmission at that rate was thereafter provided in other digital data transmission offerings. This transmission rate was achieved by using the technology developed for the so-called T1 carrier system which had to that point been principally used to interconnect telephone central offices. Here again, the transmission scheme involved a four-wire circuit and a bipolar transmission format. Indeed, the design of DDS was based on the previously existing T1 technology. At the 1.544 Mb/s rate, however, compensation for channel distortion and noise required equalization and regeneration of the line signal typically at every 3000 ft (6 kft).

The above approaches are certainly technically sound and are used quite extensively. However, not only is transmission based on T1 technology relatively expensive to provide and maintain see for example, Method and Apparatus for Wideband Transmission of Digital Signals Between, For Example, a Telephone Central Office and Customer locations, U.S. Pat. No. 4,924,492 issued to Gitlin et al., which is hereby incorporated by reference, more demanding applications for the telephone network have arisen. Although video on demand services, for example, can be accommodated within the framework of Asymmetric Digital Subscriber Line services (ADSL), at a data rate of only 1.544 Mb/s see for example, "PSTN Architecture For Video On Demand Services", U.S. Pat. No. 5,247,347 issued to Litteral et al., which is hereby incorporated by reference, even higher data rates will be required for some applications. Very high data rate subscriber line (VDSL) systems will address the requirements of these applications such as the delivery of high definition television. Further, the trend has been that data rates considered high today are considered low several years later.

As noted above, at some point a high bandwidth medium, such as optical fiber, may very well provide a communications path from every telephone operating company to every customer location, thus allowing high speed data communications through the telephone network. In the interim, however, VDSL systems may employ a mix of technologies to establish high speed communications to every customer location. A two wire pair can support data rates up to 51.84 Mb/s, 25.92 Mb/s, or 12.96 Mb/s for respective distances of 1 kft, 3 kft, and 4.5 kft. Because the ubiquitous two wire pairs currently provide connection from most customer locations to the PSTN, it would be advantageous to capitalize on this enormous installed base. That is, rather than incurring the expense and inconvenience associated with replacing all two wire pairs with optical fiber, telephone companies could employ optical fiber to distribute data to a point within the range of twisted pairs for a desired data rate. From this point, a distribution cable containing several twisted pairs could connect to individual premises within the neighborhood. In some cases, the entire neighborhood may be within the desired two-wire range of a central office, for example, within 3 kft where 25.9 Mb/s services are desired. In those cases, the distribution cable could run directly from the central office to customer locations. For those situations where the customer locations are outside the desired two-wire range, an optical fiber could connect the central office to an optical network unit which would provide an interface between the optical fiber and one or more two-wire distribution cables.

Generally, it would be desirable to support both symmetric and asymmetric services within such a neighborhood and, therefore, within a single distribution cable. Asymmetric services would accommodate such applications as video on demand, in which an upstream channel, that is the channel from the customer locations to the telephone network, requires substantially less bandwidth than a downstream channel, or the channel from the network to the customer location. Symmetric services would be directed toward applications, such as working at home, which requires inter-computer communications, in which the upstream and downstream channels require substantially the same bandwidth. Additionally, it would be desirable to provide flexibility to telephone companies and their customers by supporting various asymmetric ratios within a given cable.

One of the difficulties that arises when attempting to provide such a variety of services within a single cable is that the information carrying capacity of any channel is limited by the channel's bandwidth and noise. In the context of two wire local loops, near-end cross talk, that is, interference from a transmitter at one end of the cable with a receiver at the same end of the cable, has the greatest potential for degradation of the channel's information capacity. One approach to providing duplex operations for a given distribution cable is time division duplexing (TDD). In a time division duplexing system, near-end cross talk is virtually eliminated by insuring that no transmitter transmits at the same time a receiver at its end of the cable is receiving. Analogously, in a frequency division duplexing (FDD) system, near-end cross talk is substantially reduced by insuring that a transmitter employs a different frequency band to transmit than the frequency band receivers at the same end of the cable use for receiving.

There are advantages and disadvantages to both FDD and TDD systems. For example, a TDD system must synchronize frames across an entire cable in order to reduce near-end cross-talk, but an FDD system need not do so. Additionally, since the loss of synchronization in a two-wire pair could seriously degrade service in adjacent pairs within a cable, a TDD system is generally more vulnerable to faults in a communications system's digital electronics. Another way in which FDD systems are generally more attractive than TDD systems involves the fact that, although crosstalk can be substantially reduced, it is generally not entirely eliminated. This residual crosstalk can be demodulated by a nonlinearity on a telephone line to produce noise. Noise from a FDD system would sound like stationary white noise to a human listener, but noise from a TDD system would sound like white noise modulated by on/off keying with a cycle rate near the peak response of the human ear. Additionally, any attempt at mixing symmetric and asymmetric services in a TDD system would seriously degrade the available data rate of the symmetric services.

For the above reasons an FDD system may appear to be the system of choice, but FDD system implementations are not without difficulty. Since symmetric and asymmetric services may be distributed to the same neighborhood, the bandwidth of the telephone cable should be allocated in a way which supports both symmetric and asymmetric services. Additionally, since the customers for these services may be distributed throughout a neighborhood, it would be highly desirable to provide symmetric and asymmetric services of different reaches. However, since attenuation and far end cross talk are more pronounced at higher frequencies, the spectral utilization of a channel which affords longer reach is preferably concentrated at lower frequencies. If all the end users supported by a cable were the same distance from the cable's point of origin and all required exactly the same services, allocation of the cable's frequency bands would be a fairly straightforward matter. When supporting services of various symmetries and loops of various lengths, however the proper allocation of frequency presents a daunting task.

SUMMARY OF THE INVENTION

The invention is directed to a very high speed digital subscriber line system and methods for providing the same. The VDSL system provides full duplex symmetric and asymmetric communications within a distribution cable, while substantially maximizing the cable's information capacity by reducing near-end cross talk.

In one aspect, the invention comprises a method of frequency division duplexing which allocates upstream and downstream frequency channels that are separated by a guard band in order to substantially eliminate near-end crosstalk. In a preferred embodiment, for asymmetric services, the guard band preferably shifts along with upstream and downstream channels as they shift to accommodate different reaches and the asymmetric upstream channel is preferably located at a lower frequency range than that of the asymmetric downstream channel. This guard band shifting permits the VDSL system to utilize a greater percentage of the frequencies available to it and to thereby substantially maximize the communications rate that it can support. Although the asymmetric guard band is allowed to shift in the manner described, it is not allowed to do so in a manner that would create a conflict with symmetric channels. Additionally, the presently preferred embodiment provides upstream channels both above and below a downstream symmetric channel and all the channels, symmetric and asymmetric, are located so as not to interfere with one another.

These and other features, aspects and advantages of the invention will be apparent to those skilled in the art from the following detailed description, taken together with the accompanying drawings.

DETAILED DESCRIPTION OF THE INVENTION

The present invention is directed to aspects of a very high data rate subscriber line system which accommodates both asymmetric and symmetric services of differing reaches. The new system employs frequency division duplexing, with frequencies assigned in such a manner as to avoid near-end crosstalk.

Figure 1:
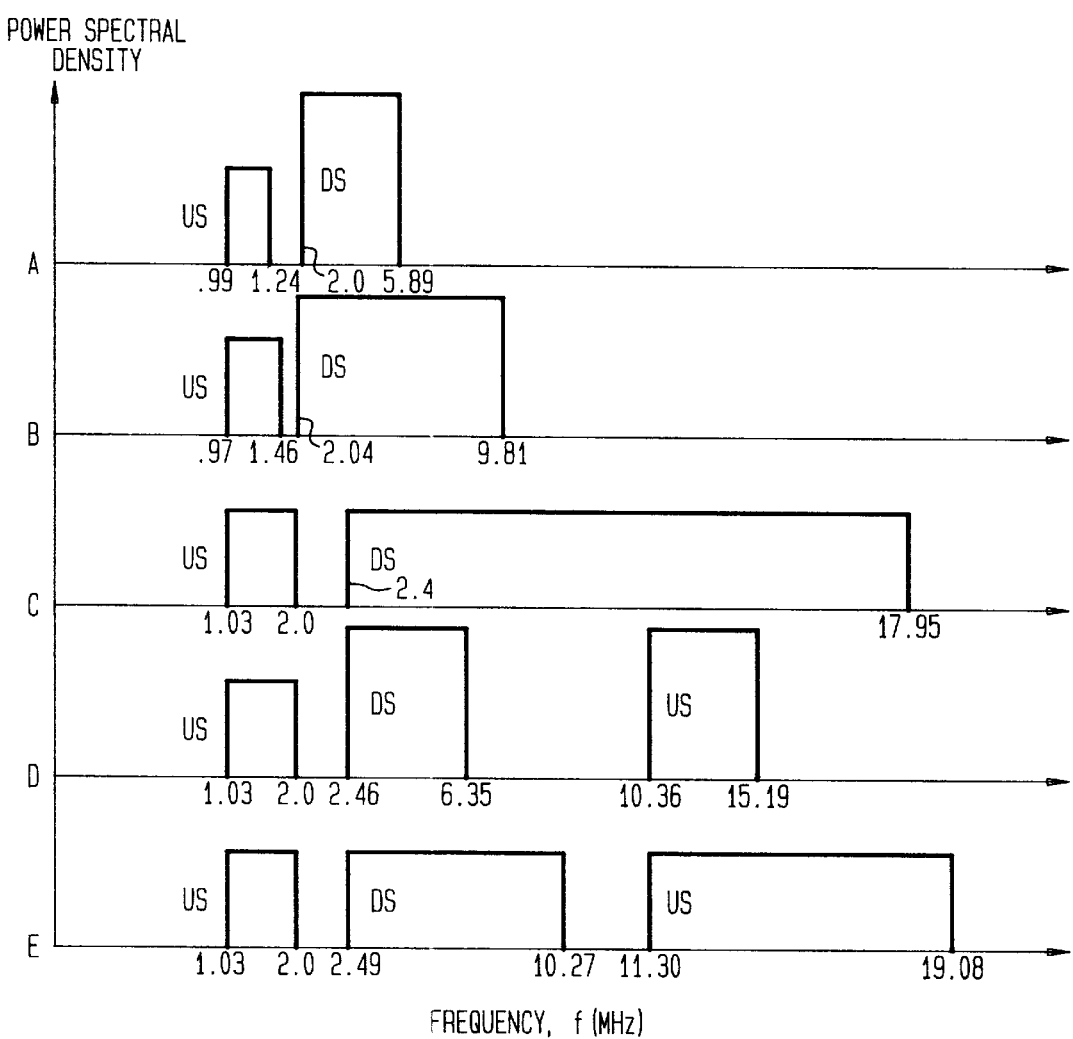
FIG. 1 is a plot of power spectral density versus frequency for duplex communications channels according to the present invention.

FIG. 1 plots power spectral density versus frequency, f, in MHz for the following services A long reach asymmetric, B medium reach asymmetric, C short reach asymmetric, D medium reach symmetric, and E short reach symmetric according to the present invention. Upstream communication channels, that is, communication channels set aside for communication from a customer location to a central office, are labeled US and downstream communication channels, those channels set aside for communications from the central office to a customer location, are labeled DS. Because attenuation and far end cross talk and attenuation are more pronounced at higher frequency, the power spectral density of a channel which affords longer reach is preferably concentrated at lower frequencies. Consequently, it is seen that shorter reach channels occupy more of the available bandwidth, while the longer reach channels are compressed toward the lower end of the bandwidth. Asymmetric upstream channels are placed below asymmetric down stream channels in order to accommodate the foreshortening of available bandwidth that occurs with increased reach.

A set of upstream channels which service short-, medium-, and long-reach asymmetric services, as well as short- and medium-reach symmetric services preferably all begin at approximately the same low frequency $F_{uslo}$. For example, the presently preferred short-reach asymmetric, and medium- and short-reach symmetric channels all begin at 1.03 MHz, and the medium-, and long-reach asymmetric upstream channels begin at 0.97, and 0.99 MHz, respectively. However, the upper frequency limit $F_{ushi}$ of these channels varies, with short-reach asymmetric and the lower channel of the long- and medium-reach symmetric upstream channels all employing the same upper frequency limit, 2.0 MHz, and medium- and long-reach asymmetric upstream channels employing progressively lower frequencies as the upper bound of their upstream channels, 1.46 MHz and 1.24 MHz, respectively, in the presently preferred embodiment. The preferred embodiment is tailored toward asymmetric operations, so that the upper limits of the lower frequency short- and medium-reach upstream symmetric channels are both 2.0 MHz. The separation band between long reach upstream and downstream asymmetric channels is generally greater than that between upstream and downstream medium range channels, with a similar relationship between medium and short reach channels, in order to provide comparable performance, using channel separation filters having substantially the same complexity.

The lowest frequency for each of the downstream channels $F_{dslo}$ is higher than the highest frequency of any of the upstream channels, with the exception that there are upstream symmetric channels placed above the downstream symmetric channels. The medium and short-reach downstream symmetric channels and the short-reach asymmetric downstream channels all have approximately the same lower frequency bound, $F_{dslo}$, equal to 2.46, 2.47, and 2.40 MHz, respectively. As illustrated by plots D and E, symmetric services have upstream channels located above the downstream channels. Although the channel assignments are illustrated as rectangles, actual implementations would experience rolloff, so that the vertical portions of plots A, B, C, D, and E would be rounded off towards the tops of the plots, with little or no signal power leaking from one channel into an adjacent one.

In order to provide greater bandwidth for upstream symmetric services, upstream channels are preferably located both below and above the frequency allotments of the downstream channels for medium- and short-reach symmetric services. Although this allocation of channel frequencies leads to channel overlap between the short-reach downstream asymmetric channel and the symmetric upstream channels located above the downstream symmetric channels, signal conflicts can be avoided by geographic means. It is expected that symmetric service will be used primarily by small businesses and that asymmetric services will be used in residences. Thus, it is to be expected that there will be a much larger deployment of asymmetrical services than symmetrical. In those peripheral areas where there is a need for symmetric services, the telephone companies can guarantee spectral compatibility by only offering medium and long reach asymmetric services.

To maximize available data rates, multilevel signalling is preferably employed, with all lower upstream channels using two-hundred and fifty-six and smaller sized signal constellations, the downstream channels using a sixteen signal constellation, and the high frequency upstream channels using four- and eight-symbol constellations for medium- and short-reach applications, respectively. Data rates could be adjusted to accommodate line conditions. For example, should a connection be particularly noisy, the upstream channel could be reduced from two hundred fifty-six level to sixty four level signalling. Multilevel signalling is known in the art and discussed, for example in "Digital and Analog Communication Systems", by Leon W. Couch II, Macmillan Publishing Company, Inc. 1983, pages 214–223, which are hereby incorporated by reference.

Figure 2:
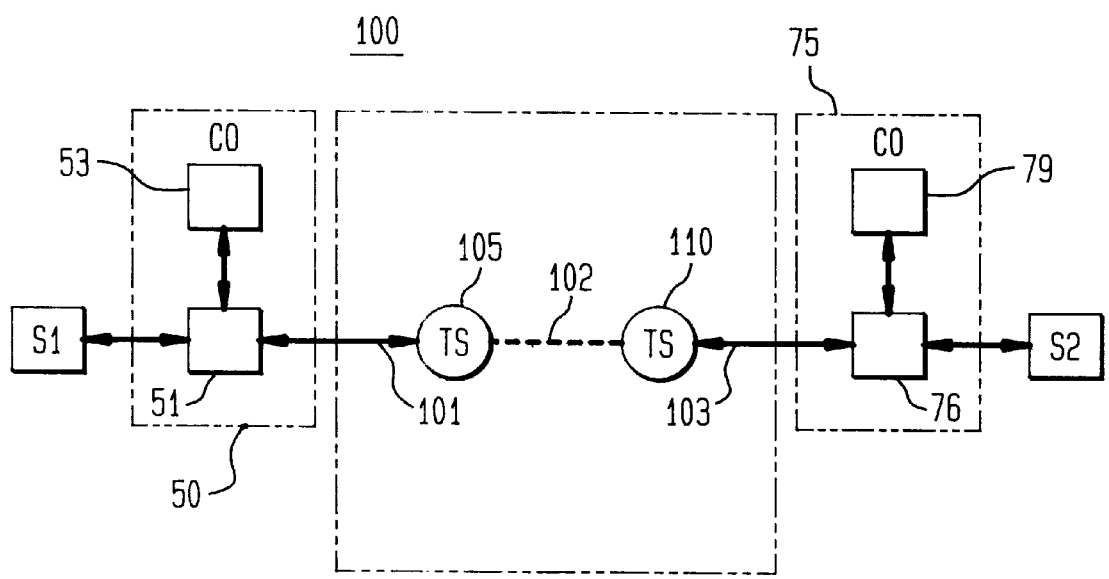
FIG. 2 is a block diagram of a telecommunications network which employs the communications channel assignments of FIG. 1.

A simplified block diagram of a telecommunications network 100 that supplies duplexing services according to the present invention is illustrated in FIG. 2. The network 100 comprises, inter alia, a plurality of toll offices, such as toll offices (TS) 105 and 110, that may be interconnected to one another to provide long distance voice and data communications for subscribers, such as the telephone users, associated with station sets S1 and S2. The manner in which a telephone user, for example, the user associated with the station S1, establishes via network 100 a telephone connection to another such user, for example, the user associated with the station S2, is well known and will not be described in detail herein. However, it suffices to say that a telephone user, hereinafter also "subscriber", may establish such a connection by causing station S1 to go "off hook" and then dialing the telephone number associated with station S2. Local central office 50 associated with station S1 collects the telephone digits as they are dialed and establishes a connection 101 to a network toll office, for example, toll office 105 which may also be referred to hereinafter as a toll switch. Toll office, or switch 105, in turn, and based on the dialled telephone number that it receives from the local central office 50, establishes a connection 102 to a so-called destination toll switch, such as toll switch 110. Destination toll switch 110, in turn, extends the connection to central office 75 associated with the station S2 and passes to that office the dialled telephone number. The latter central office responsive to receipt of the dialled digits then extends the connection 103 to station S2. The subscribers positioned respectively at stations S1 and S2 may then begin to speak to one another via the established connection. As will be discussed in greater detail in relation to FIG. 4, station sets such as S1 and S2 include transmitters and receivers which employ the new upstream and downstream channels discussed in relation to FIG. 1. For the convenience of description, the functionality of all subscriber uses: voice or data, asymmetric video-on-demand or symmetric intra-computer communications, or other telecommunications service, is incorporated within stations sets such as S1 and S2. Host digital terminals 51 and 76 are located at central offices 50 and 75, respectively. These terminals separate narrowband signals such as ISDN and plain old telephone service (POTS) from the wideband services which employ the new frequency division duplexing system. Narrowband signals are passed on to toll switches 101 and 103, as just described. Wideband signals are sent respectively, to service provider host computers 53 and 79 which provide the wideband services, such as internet access, video jukebox, and so on, which employ the new FDD system.

Figure 3:
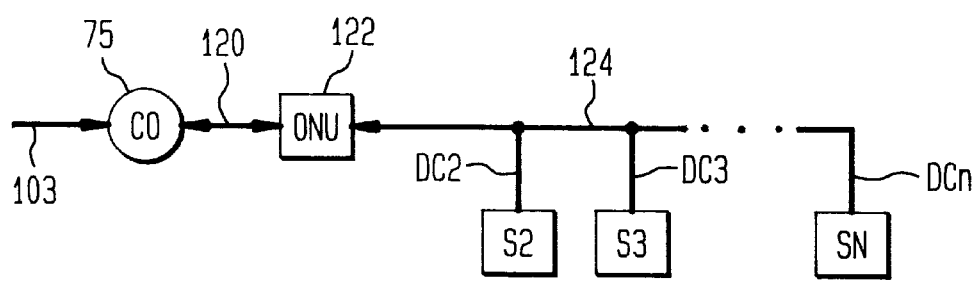
FIG. 3 is a more detailed block diagram of a portion of a telecommunications network, which illustrates a signal path from a central office to customer locations, wherein signals within the path are duplexed according to the present invention.

FIG. 3 illustrates, in greater detail, a network connection path from the connection 103 and central office 75 to station sets, such as station set S2, illustrated in FIG. 2. In a VDSL system implementation of the present invention, the system may employ an optical fiber 120 to provide a communications path between the central office 75 and an optical network unit (ONU) 122. One or more optical fibers may employed to bring communications to within a relatively short range of a group of subscribers, where short range means a range that permits high speed data to be transmitted over conventional two-wire pairs within a cable. Signals are translated between the optical and two-wire media within the optical network unit 122. Under certain circumstances, for example, when a relatively large number of subscribers are located within a short range of the central office, that is no farther than the longest reach provided for by the system, the optical fiber 120 and optical network unit 122 may be eliminated.

In implementations where the optical fiber 120 and optical network unit are employed, besides translation from optical to two-wire media, two-wire transmitters and receivers are employed, preferably within the optical network unit 122, to transmit signals to and receive signals from the station sets S2, S3 . . . Sn, which are connected to the optical network unit 122 through drop cables DC2, DC3, . . . , DCn and a distribution cable 124. Transmitters and receivers at either end of the distribution cable 124 employ frequency division duplexing, with the channels defined according to those set forth in FIG. 1. The distribution cable includes binder groups which typically consist of twelve to twenty five two-wire twisted pairs and the potential for crosstalk is greatest within any of these binder groups, as opposed to inter-binder group crosstalk.

Figure 4:
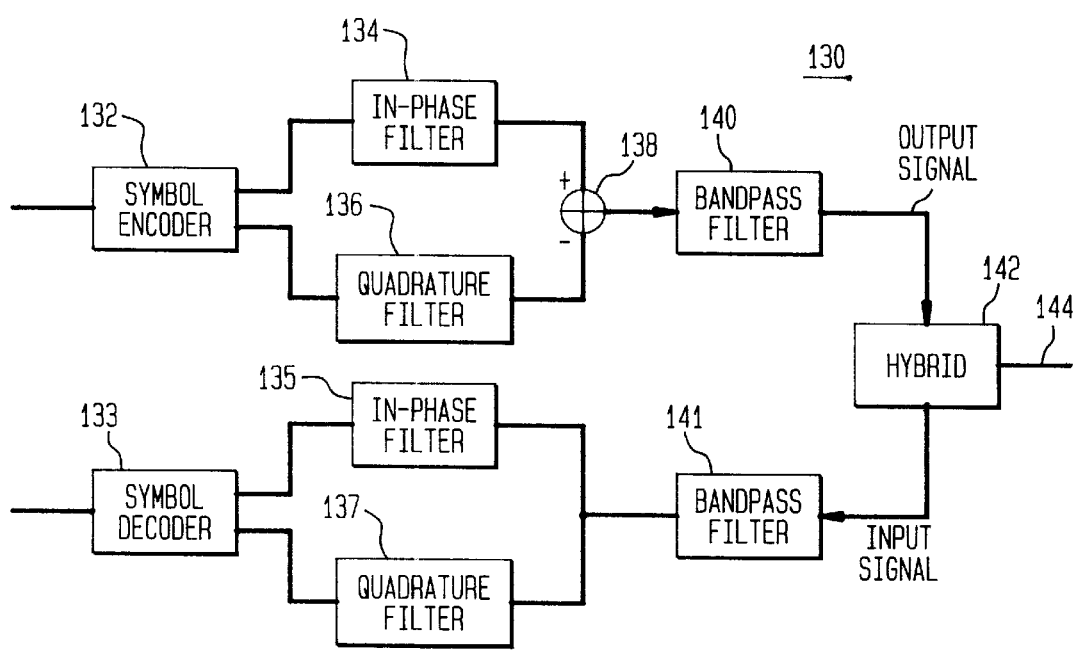
FIG. 4 is a block diagram of one embodiment of a transmitter portion of a transceiver which may suitably be employed within the new duplexing network.

FIG. 4 is a block diagram illustrating a transceiver 130 that may be employed within the new VDSL network. The illustrated block diagram is for a transceiver which employs carrierless amplitude and phase modulation to implement multilevel signalling, but other passband transmission schemes, such as multi-carrier and quadrature amplitude modulation, are contemplated by the invention. Data is received at a symbol encoder 132 which maps blocks of m bits into one of $k=2^m$ different complex symbols. The encoded data stream is divided into two paths, in-phase and quadrature, and the two symbol streams are sent to in-phase filter 134 and quadrature shaping filters 136, respectively. The output of the in-phase filter 134 and the negative of the quadrature filter 136 are summed at block 138 into a single signal with two orthogonal components. The resultant signal is filtered by bandpass filter 140, which provides the output signal for transmission within the assigned channel, 0.99 MHz to 1.24 MHz for an upstream long reach asymmetric service, for example. The signal is sent to the hybrid circuit 142 and, from there, to the two wire twisted pair 144. In the receive mode, an input signal arrives on the two wire twisted pair 144, travels through the hybrid circuit 142 and is bandpass filtered by the receiver bandpass filter 141 to exclude all energy but that in the downstream channel, from 2.0 to 5.89 MHz in this example. The filtered signal is then sent to in-phase filter 135 and quadrature filter 137 and from there to the symbol decoder 133 which produces an m-bit bit stream from $2^m$ different received complex symbols.

Figure 5:
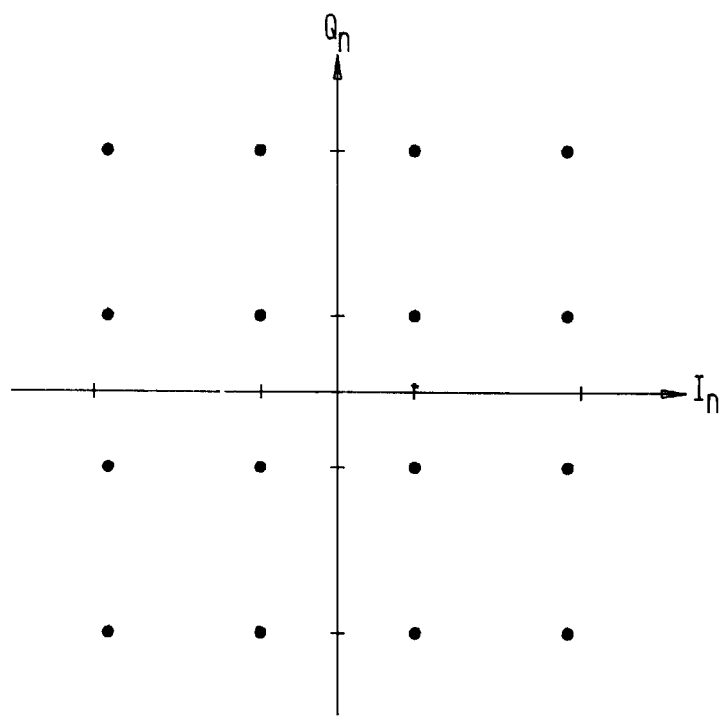
FIG. 5 is a plot of a sixteen signal constellation employed by some of the channels within the new duplexing system.
Figure 6:
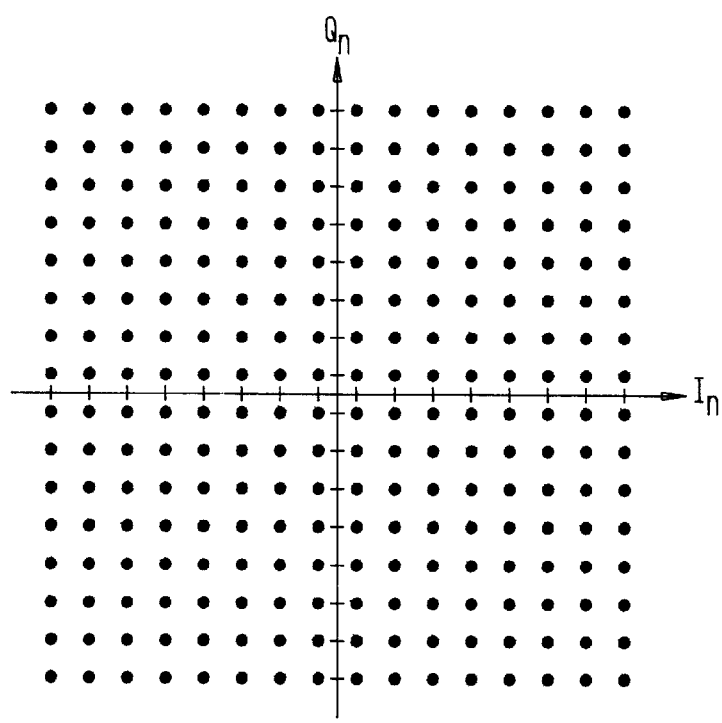
FIG. 6 is a plot of a two hundred and fifty-six signal constellation employed by upstream channels within the new duplexing system.

A sixteen symbol constellation, which may suitably be employed in the preferred embodiment for all downstream channels is illustrated in FIG. 5. The quadrature value, Qn, of the nth symbol is represented with respect to the vertical axis and the in-phase value, In, is represented with respect to the horizontal axis. Each symbol in this case, represents a block of four bits. A two hundred and fifty six symbol constellation, such as is employed in the preferred embodiment of the present invention is illustrated in FIG. 6, where quadrature and in-phase values are represented along the vertical and horizontal axes, respectively, and each symbol represents a block of eight bits.

Figure 7:
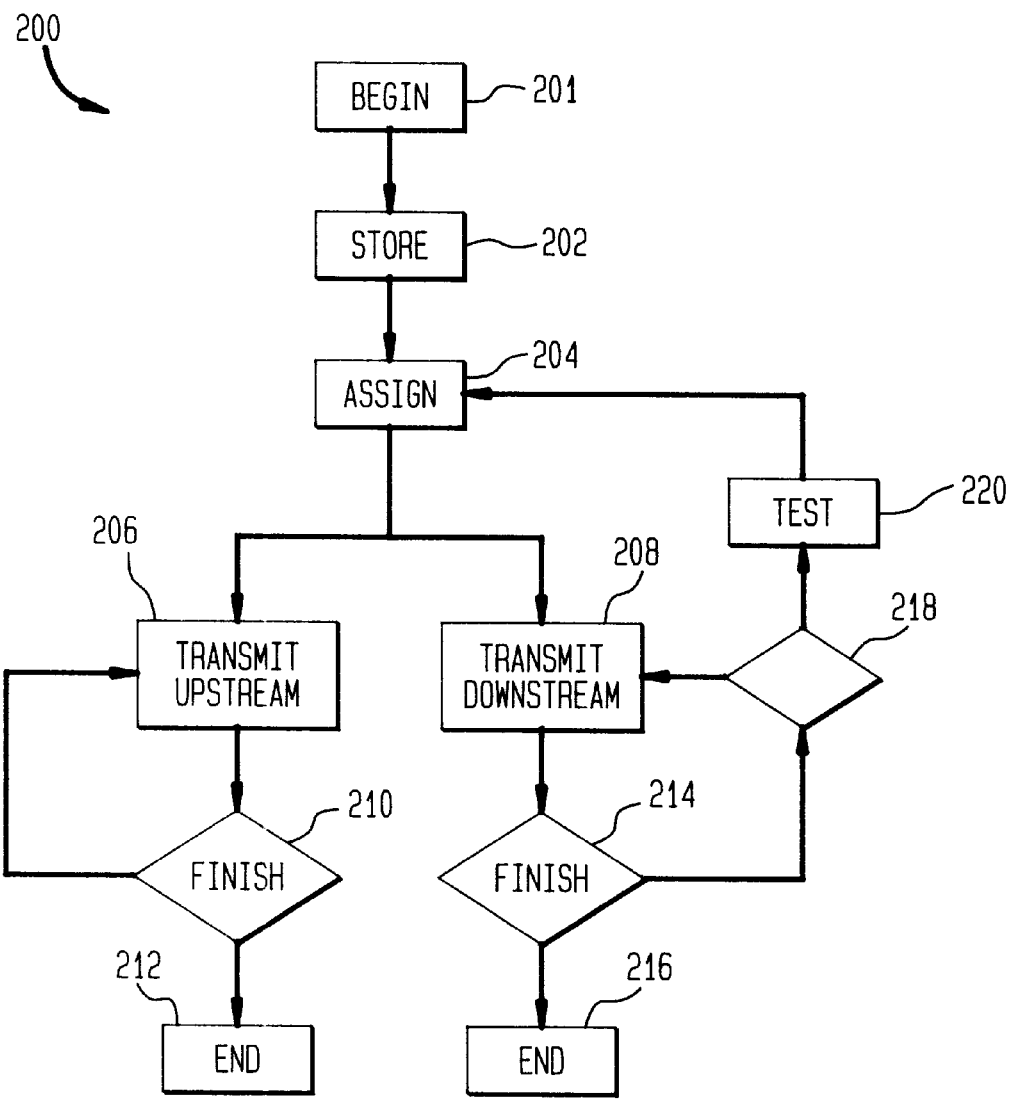
FIG. 7 is a flow chart which depicts the operation of the new duplexing system.

FIG. 7 is a flow chart which illustrates the method of operating a VDSL system 200 according to the present invention. The process begins at step 201, then proceeds to step 202, where subscriber information is stored, preferably at a central office. Such information may include, for example, the customer's distance along a distribution cable which carries the customer's two-wire pair, the type of service the customer has subscribed to, for example, asymmetric or symmetric service. This information is retrieved in step 204 where the type of service and reach information is employed to assign channels for upstream and downstream communications according to those discussed in relation to FIG. 1. The specific frequency bands will be determined by the type of service and reach for each local loop. Reach information may also be determined by the transmission of a test signal to determine the quality of service over the loop and the reach of the loop. Such a test signal may be sent at various times, if not regular intervals, in order to adjust the channel assignments on a continuous or regular basis. After system parameters have been transmitted, operation proceeds to steps 206 and 208, where VDSL upstream and downstream transmission may take place simultaneously, sharing network facilities with voice and other data services. Upstream operation proceeds to step 210, where it is determined whether all the desired upstream data has been transmitted. If the upstream transmission is complete, the upstream process proceeds to step 212, where it terminates operation. If the upstream transmission is not complete it proceeds to step 206. The downstream transmission proceeds from step 208 to step 214, where it determines whether downstream transmission is complete and, if so, it proceeds to step 216. If downstream transmission is incomplete the downstream process proceeds to step 218, where a decision is made to either transmit more data or test the channel and reassign channel parameters. If the decision is made to test the channel, the process advances to step 220, where the channel is tested and, from there to step 204, where the channels are assigned.

The forgoing description of specific embodiments of the invention has been presented for the purposes of illustration and description. It is not intended to be exhaustive or to limit the invention to the precise forms disclosed, and many modifications and variations are possible in light of the above teachings. For example, although two-wire media was discussed as the media of choice for implementation of local loops, other physical media, such as wireless, are contemplated. The embodiments were chosen and described in order to best explain the principles of the invention and its practical application, to thereby enable others skilled in the art to best utilize the invention. It is intended that the scope of the invention be limited only by the claims appended hereto.

We claim:

1. A frequency division duplexing telecommunications system which provides very high speed digital subscriber line symmetric and asymmetric services to a plurality of subscribers connected to said system by local subscriber loops comprising varying lengths of two wire pairs thereby defining local subscriber loops of varying reach, said system comprising:

an upstream transmitter which transmits over the local subscriber loops within a relatively low frequency upstream channel, and a downstream transmitter which transmits within a downstream channel that is a higher frequency channel than said relatively low frequency upstream channel, wherein said frequency channels are separated by a guard band, the upstream and downstream channels are varied with the reach of a particular subscriber local loop, and the guard band varies along with the upstream and downstream channels, with the lowest frequency of the upstream channel remaining substantially the same while the lowest frequency of the downstream channel shifts to a lower frequency as the reach of the particular subscriber loop increases.

2. The system of claim 1, wherein transmissions are sent over local subscriber loops and all pairs of said frequency channels are shifted to lower frequencies to accommodate longer reaches, while maintaining guard bands between all of said frequency channels.

3. The system of claim 1, wherein said transmitters employ multilevel signalling.

4. The system of claim 3, wherein said transmitters employ a two-hundred and fifty six symbol constellation for upstream transmissions and a sixteen symbol constellation for downstream transmissions.

5. The system of claim 4, wherein said upstream channel ranges from approximately 1.03 MHz to approximately 2.00 MHz and supports a data rate of 6.48 Mb/s, and said downstream channel ranges from approximately 2.4 MHz to approximately 17.95 MHz and supports a data rate of 51.84 Mb/s for short reach asymmetric loops.

6. The system of claim 4, wherein said upstream channel ranges from approximately 0.97 MHz to approximately 1.46 MHz and supports a data rate of 3.24 Mb/S, and said downstream channel ranges from approximately 2.04 MHz to approximately 9.81 MHz and supports a data rate of 25.92 Mb/s for medium reach asymmetric loops.

7. The system of claim 4, wherein said upstream channel ranges from approximately 0.99 MHz to approximately 1.24 MHz and supports a data rate of 1.62 Mb/s, and said downstream channel ranges from approximately 2 MHz to approximately 5.89 MHz and supports a data rate of 12.96 Mb/s for long reach asymmetric loops.

8. The system of claim 4, wherein said upstream channels range from approximately 1.03 MHz to approximately 2.00 MHz and from approximately 11.3 MHz to approximately 19.08 MHz and support a data rate of 25.92 Mb/s, and said downstream channel ranges from approximately 2.49 MHz to approximately 10.27 MHz and supports a data rate of 25.92 Mb/s for short reach asymmetric loops.

9. The system of claim 4, wherein said upstream channels range from approximately 1.03 MHz to approximately 2.0 MHz and from approximately 10.36 MHz to approximately 15.19 MHz and support a data rate of 12.96 Mb/S, and said downstream channel ranges from approximately 2.46 MHz to approximately 6.35 MHz and supports a data rate of 12.96 Mb/s for medium reach asymmetric loops.

10. A frequency division duplexing telecommunications system which provides very high speed digital subscriber line symmetric and asymmetric services, comprising:

an upstream transmitter which transmits over a two wire local loop within a relatively low frequency upstream channel, a downstream transmitter which transmits within a downstream channel that is a higher frequency channel than said relatively low frequency upstream channel, wherein said frequency channels are separated by a guard band, the upstream and downstream channels are varied with the reach of the local loop, and the guard band varies along with the upstream and downstream channels, with the lowest frequency of the upstream channel remaining substantially the same while the lowest frequency of the downstream channel shifts to a lower frequency as the reach of the local loop increases, and an upstream transmitter which transmits within an upstream channel that is a frequency channel higher than that of said downstream channel.

11. The system of claim 10, wherein transmissions are sent over local subscriber loops and all of said frequency channels are shifted to lower frequencies to accommodate longer reaches, while maintaining guard bands between all pairs of said frequency channels.

12. The system of claim 10, wherein said transmitters employ multilevel signalling.

13. The system of claim 12, wherein said transmitters employ a two-hundred and fifty six symbol constellation for upstream transmissions and a sixteen symbol constellation for downstream transmissions.

14. The system of claim 13, wherein said upstream channel ranges from approximately 1.03 MHz to approximately 2.00 MHz and supports a data rate of 6.48 Mb/s, and said downstream channel ranges from approximately 2.4 MHz to approximately 17.95 MHz and supports a data rate of 51.84 Mb/s for short reach asymmetric loops.

15. The system of claim 13, wherein said upstream channel ranges from approximately 0.97 MHz to approximately 1.46 MHz and supports a data rate of 3.24 Mb/S, and said downstream channel ranges from approximately 2.04 MHz to approximately 9.81 MHz and supports a data rate of 25.92 Mb/s for medium reach asymmetric loops.

16. The system of claim 13, wherein said upstream channel ranges from approximately 0.99 MHz to approximately 1.24 MHz and supports a data rate of 1.62 Mb/s, and said downstream channel ranges from approximately 2 MHz to approximately 5.89 MHz and supports a data rate of 12.96 Mb/s for long reach asymmetric loops.

17. The system of claim 13, wherein said upstream channels range from approximately 1.03 MHz to approximately 2.00 MHz and from approximately 11.3 MHz to approximately 19.08 MHz and support a data rate of 25.92 Mb/s, and said downstream channel ranges from approximately 2.49 MHz to approximately 10.27 MHz and supports a data rate of 25.92 Mb/s for short reach asymmetric loops.

18. The system of claim 13, wherein said upstream channels range from approximately 1.03 MHz to approximately 2.0 MHz and from approximately 10.36 MHz to approximately 15.19 MHz and support a data rate of 12.96 Mb/S, and said downstream channel ranges from approximately 2.46 MHz to approximately 6.35 MHz and supports a data rate of 12.96 Mb/s for medium reach asymmetric loops.

19. A method of providing very high speed digital subscriber line duplex telecommunications services, comprising the steps of:
 a) assigning frequency channels for upstream and downstream communications whereby;
   i) an upstream transmitter transmits over a local loop within a relatively low frequency upstream channel,
   ii) a downstream transmitter transmits within a downstream channel that is a higher frequency channel than said relatively low frequency upstream channel,
   iii) wherein said frequency channels are separated by a guard band,
   iv) the frequency bands of the upstream and downstream channels are varied with the reach of the local loop,
   v) and the guard band varies along with the upstream and downstream channels,
   vi) with the lowest frequency of the upstream channel remaining substantially the same,
   vii) while the lowest frequency of the downstream channel shifts to a lower frequency as the reach of the loop increases, and
   viii) an upstream transmitter transmits within an upstream channel that is a frequency channel higher than that of said downstream channel;
 b) transmitting the assignment information of step a to subscribers and central offices within a telecommunications system; and
 c) transmitting data between a central office and a subscriber location employing the frequency channels assigned in step a.

20. The method of claim 19 further comprising the step storing the assignment information at a central office.

21. The method of claim 19 further comprising the step of storing information indicative of a local loop's service type at a central office so that subscribers who are to receive symmetric services or asymmetric services are identified by such stored information.

22. The method of claim 19 wherein the step of assigning frequency channels comprises sending a test signal to a subscriber and determining the frequency profile according to the quality of the channel, as indicated by said test signal.

* * * * *